(12) United States Patent
Ito

(10) Patent No.: US 12,166,930 B2
(45) Date of Patent: Dec. 10, 2024

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Hiroki Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 17/491,248

(22) Filed: Sep. 30, 2021

(65) Prior Publication Data

US 2022/0109765 A1 Apr. 7, 2022

(30) Foreign Application Priority Data

Oct. 7, 2020 (JP) .................................. 2020-169903

(51) Int. Cl.
*H04N 1/00* (2006.01)
(52) U.S. Cl.
CPC ..... *H04N 1/00474* (2013.01); *H04N 1/00411* (2013.01); *H04N 1/00896* (2013.01)
(58) Field of Classification Search
CPC ........... H04N 1/00474; H04N 1/00411; H04N 1/00896

USPC ......................................................... 358/1.13
See application file for complete search history.

(56) References Cited

U.S. PATENT DOCUMENTS

| | | | |
|---|---|---|---|
| 9,906,674 B2* | 2/2018 | Nishii | G06F 3/1222 |
| 2009/0201527 A1* | 8/2009 | Yamada | H04N 1/00411 358/1.15 |
| 2013/0083344 A1* | 4/2013 | Funakawa | H04N 1/00127 358/1.14 |
| 2018/0321732 A1* | 11/2018 | Fukushi | G06F 3/1204 |
| 2019/0306345 A1* | 10/2019 | Kohara | G06F 3/0412 |

FOREIGN PATENT DOCUMENTS

| | | |
|---|---|---|
| JP | 2006227171 A | 8/2006 |
| JP | 2012203132 A | 10/2012 |

* cited by examiner

*Primary Examiner* — Neil R McLean
(74) *Attorney, Agent, or Firm* — Canon U.S.A., Inc. IP Division

(57) ABSTRACT

When a home position sensor detects that an operation unit has been moved out of a home position, a function of a human detection sensor is temporarily disabled. This makes it possible to prevent the human detection sensor from wastefully continuing the detection operation although the human detection sensor is unable to detect a person intending to use an image forming apparatus, and from erroneously detecting a person not intending to use the image forming apparatus.

17 Claims, 8 Drawing Sheets

INFORMATION PROCESSING APPARATUS, METHOD FOR CONTROLLING THE SAME, AND STORAGE MEDIUM

BACKGROUND

Field

The present disclosure relates to an information processing apparatus, a method for controlling the information processing apparatus, and a storage medium.

Description of the Related Art

Conventionally, many information processing apparatuses such as image forming apparatuses include a dedicated operation unit that includes an input device such as a touch panel or a numeric keypad, a display device such as a liquid crystal display (LCD), and a control board on which a central processing unit (CPU) is mounted.

Such a dedicated operation unit is not limited to an operation unit fixed in a certain position in an information processing apparatus; may be movable to a location where the operation unit is easily visible to a user, a service engineer, or other persons.

As implementations of such movable operation units, an operation unit having a tilt mechanism or an arm mechanism to change the angle or the position of the operation unit, an operation unit connected to a main body of an information processing apparatus either with a wired cable or wirelessly, and a detachable operation unit, among other things, have been discussed.

For example, Japanese Patent Application Laid-Open No. 2006-227171 discusses an operation unit of an image forming apparatus that can be used while being detached from a main body of the image forming apparatus, in order to improve operability.

Furthermore, conventionally, some information processing apparatuses such as image forming apparatuses include a human detection sensor. The human detection sensor can be used to detect a user intending to use the image forming apparatus, for example.

In some information processing apparatuses, the human detection sensor may be used as part of a system for automatically shifting the image forming apparatus to a standby state having high power consumption when a person is detected in a state where the image forming apparatus is operating in a sleep state having low power consumption.

For example, Japanese Patent Application Laid-Open No. 2012-203132 discusses a method in which an image forming apparatus is provided with a human detection sensor and is configured to return from a power saving mode when the human detection sensor detects an approaching person. In the method discussed in Japanese Patent Application Laid-Open No. 2012-203132, the human detection sensor detects whether a person has entered a predetermined range from the image forming apparatus. The detection range of the human detection sensor in the image forming apparatus is generally preset so that the human detection sensor can detect a person approaching a main body housing or an operation unit of the image forming apparatus, as a person intending to use the image forming apparatus.

As described above, the human detection sensor performs detection within a predetermined range in order to detect a person approaching the main body housing or the operation unit of the apparatus. Thus, in the case of an information processing apparatus such as an image forming apparatus including the human detection sensor in the main body and a movable operation unit, when the operation unit is moved, the person approaching the operation unit to operate the operation unit may be outside the detection range of the human detection sensor.

SUMMARY

According to various embodiments of the present disclosure, an information processing apparatus is provided which includes an operation unit including an input portion configured to receive a user's operation, the operation unit being provided in a manner so as to be movable by a user, a first detection unit configured to detect whether the operation unit is placed at a predetermined position, a second detection unit configured to detect a presence of a detection target in a detecting space beside the information processing apparatus, and a control unit configured to disable a function of the second detection unit in a case where the first detection unit detects that the operation unit is not placed at the predetermined position.

Further features of embodiments of the present disclosure will become apparent from the following description of exemplary embodiments with reference to the attached drawings.

DESCRIPTION OF THE EMBODIMENTS

Exemplary embodiments of the present disclosure will be described below with reference to the drawings.

The exemplary embodiments described below are merely examples, and the below description is not intended to limit the scope of the present disclosure to the exemplary embodiments. Furthermore, all combinations of features described in the exemplary embodiments described below are not necessarily essential for every embodiment of the present disclosure.

Figure 1:
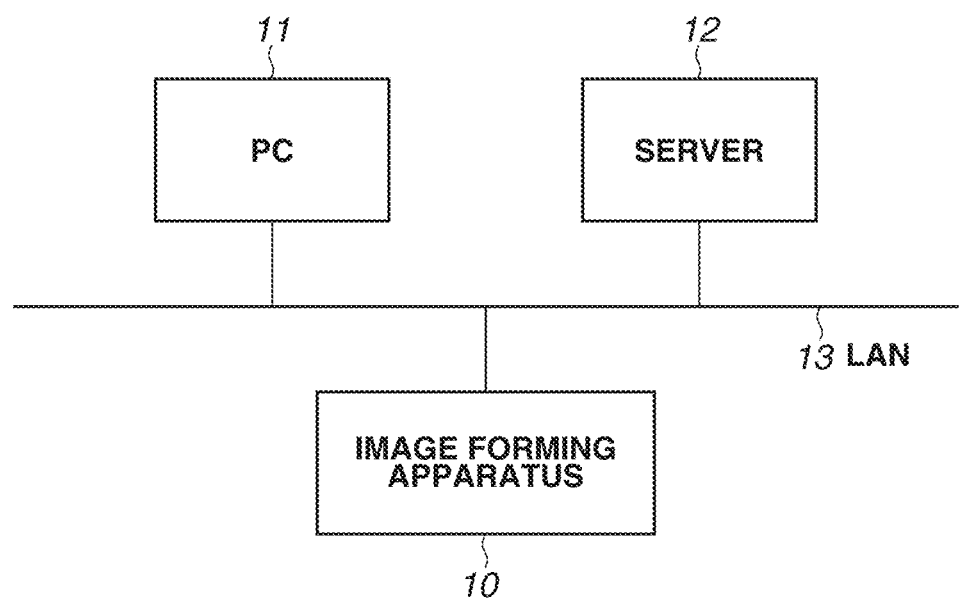
FIG. 1 is a diagram illustrating an example of a configuration of an image forming system according to one embodiment.

FIG. 1 is a diagram illustrating an example of a configuration of an image forming system according to a first exemplary embodiment of the present disclosure. In the image forming system according to the present exemplary embodiment, a personal computer (PC) 11, a server 12, and an image forming apparatus 10 are connected to one another through a local area network (LAN) 13.

The image forming apparatus 10 is an example of an information processing apparatus according to the present exemplary embodiment. The image forming apparatus 10 according to the present exemplary embodiment is an information processing apparatus including a control unit, an operation unit, and a display portion. The control unit generates image data for displaying a screen. The operation unit displays the screen on the display portion based on the image data generated by the control unit, and receives a user's operation on the screen. Specific examples of the information processing apparatus include a printer, a scanner, a copier, and a facsimile. The information processing apparatus according to the present exemplary embodiment may be an apparatus other than an image forming apparatus.

The server 12 is a computer that provides service in response to a request from a client apparatus such as the PC 11 or the image forming apparatus 10.

The PC 11 or the server 12 generates a print job including data described in a printing language such as a page description language (PDL) or data in a specific data format (e.g., data compressed by Joint Bi-level Image Experts Group (JBIG), based on a user's operation. The PC 11 or the server 12 transmits the generated print job to the image forming apparatus 10 through the LAN 13. When receiving the print job from an external apparatus such as the PC 11 or the server 12, the image forming apparatus 10 performs image formation (printing) based on the received print job.

The PC 11 or the server 12 can remotely access the image forming apparatus 10 through the LAN 13. The remote access enables the PC 11 or the server 12 to operate the image forming apparatus 10 and to monitor the state of the image forming apparatus 10. In addition, the image forming apparatus 10 can notify an external apparatus such as the PC 11 or the server 12 of the state of the image forming apparatus 10.

Figure 2A:
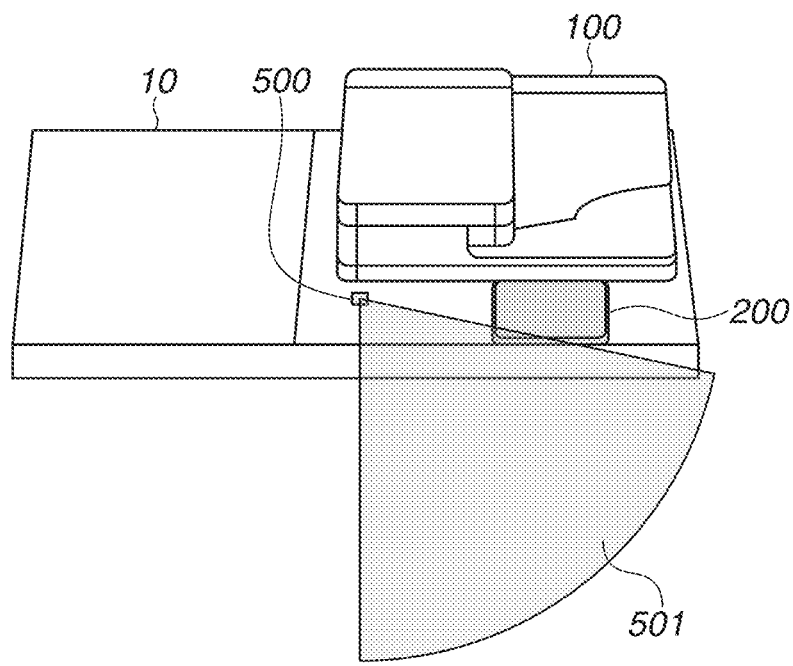
FIGS. 2A and 2B are schematic diagrams each illustrating an example of a layout of a scanner unit, an operation unit, and a human detection sensor in an image forming apparatus according to one embodiment.
Figure 2B:
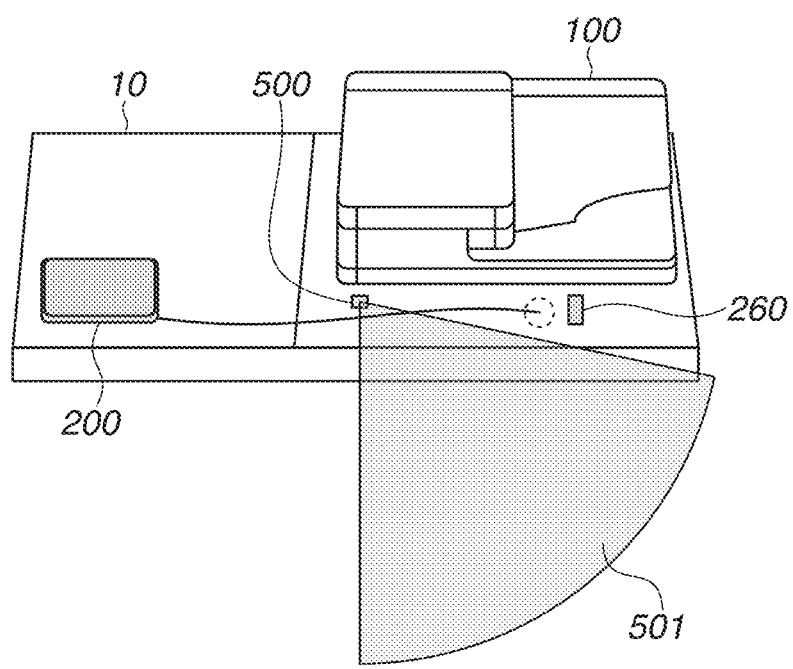

FIGS. 2A and 2B are schematic diagrams each illustrating an example of a layout of a scanner unit 100, an operation unit 200, and a human detection sensor 500 in the image forming apparatus 10 according to the present exemplary embodiment. In the present exemplary embodiment, a configuration in which the human detection sensor 500 is installed in a housing of the image forming apparatus 10 will be described as an example.

As illustrated in FIG. 2B, the operation unit 200 is connected to the image forming apparatus 10 with a dedicated wired cable, and the user can move the operation unit 200.

FIG. 2A schematically illustrates a layout in which the operation unit 200 is placed at a home position that is a predetermined initial installation position in the image forming apparatus 10. FIG. 2B schematically illustrates a layout in which the operation unit 200 is placed at a position away from the home position.

The operation unit 200 includes an input device (input portion) and a display device (display portion), both of which are not illustrated. The input device includes a touch panel that receives a user's operation. The display device includes a liquid crystal display panel that displays a screen based on data generated by a main control unit 300 (described below). In the present exemplary embodiment, the configuration in which the image forming apparatus 10 and the operation unit 200 are connected with the dedicated wired cable is described as an example. Alternatively, the image forming apparatus 10 and the operation unit 200 may be connected using a wireless communication method such as a wireless LAN or Bluetooth®.

A home position sensor (hereinafter referred to as a "HP sensor") 260 detects whether the operation unit 200 is placed at the home position. While the operation unit 200 is placed at the home position, the HP sensor 260 is in an active state. While the operation unit 200 is not placed at the home position, the HP sensor 260 is in an inactive state.

The human detection sensor 500 detects approach of the user intending to use the image forming apparatus 10. In the present exemplary embodiment, a method using a pyroelectric sensor as the human detection sensor 500 will be described as an example. Alternatively, any other method such as a method using an infrared reflective sensor or an ultrasonic reflective sensor, or a method in which an approaching person is detected by processing an image captured by a camera, may be used.

A detection range 501 of the human detection sensor 500 indicates a range where the human detection sensor 500 can detect the approach of the user intending to use the image forming apparatus 10. The detection range 501 of the human detection sensor 500 is set so that the human detection sensor 500 can detect the user approaching the image forming apparatus 10 to operate the scanner unit 100 or the operation unit 200 placed at the home position. The human detection sensor 500 can change its detection sensitivity by sensitivity of sensor. For example, sensitivity of sensor can be set in three stage: high, medium, and low. The high is easy to determine whether the user is approaching the image forming apparatus 10, and the low is difficult to determine whether the user is approaching the image forming apparatus 10.

In the state illustrated in FIG. 2A, in a case where the user approaches the scanner unit 100 to operate the scanner unit 100, the human detection sensor 500 can detect the approach of the user. Also in a case where the user approaches the operation unit 200 to operate the operation unit 200, the human detection sensor 500 can detect the approach of the user.

In contrast, in the state illustrated in FIG. 2B, in a case where the user approaches the scanner unit 100 to operate the scanner unit 100, the human detection sensor 500 can detect the approach of the user. However, in a case where the user approaches the operation unit 200 to operate the operation unit 200, the human detection sensor 500 cannot detect the approach of the user.

Figure 3:
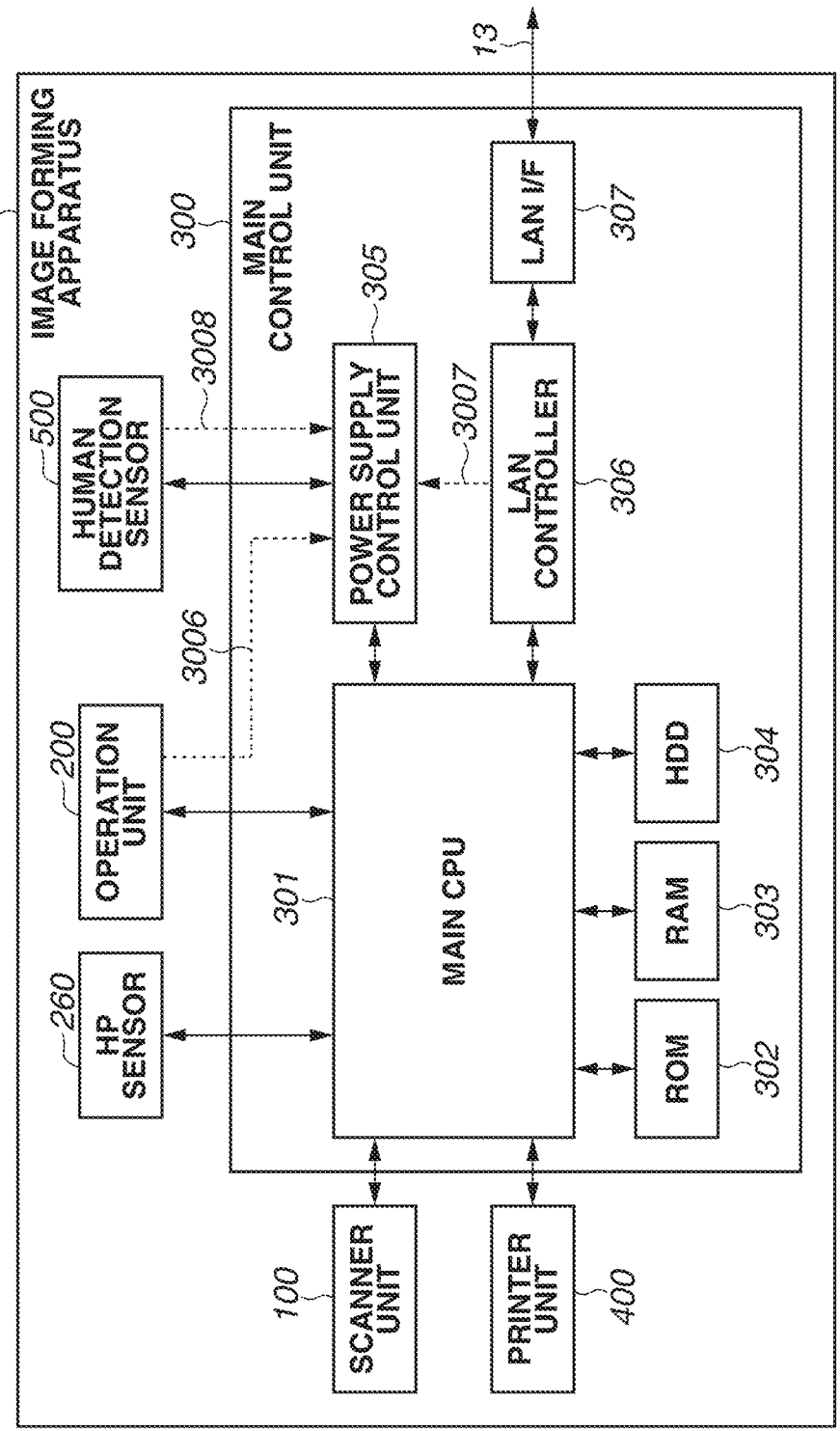
FIG. 3 is a block diagram illustrating an example of a hardware configuration of the image forming apparatus according to one embodiment.

FIG. 3 is a block diagram illustrating an example of a hardware configuration of the image forming apparatus 10.

The image forming apparatus 10 includes the scanner unit 100, the operation unit 200, the main control unit 300, a printer unit 400, the HP sensor 260, and the human detection sensor 500.

The main control unit 300 includes a main central processing unit (CPU) 301, and controls the entire image forming apparatus 10. The operation unit 200 functions as a user interface (UI), and includes the input device (not illustrated) that receives a user's operation and the display device (not illustrated) that displays a screen. In the present exemplary embodiment, the configuration in which the main control unit 300 and the operation unit 200 are connected with the dedicated wired cable is described as an example. Alternatively, the main control unit 300 and the operation unit 200 may be connected by using a wireless communication method such as a wireless LAN or Bluetooth®.

The printer unit 400 performs image forming processing on a sheet-like recording medium (paper) based on, for example, an electrophotographic method. The recording method for the recording medium is not limited thereto. The printer unit 400 may adopt any other recording method such as an inkjet method or a heat transfer method.

The main control unit 300 incudes the main CPU 301, a read only memory (ROM) 302, a random access memory (RAM) 303, a hard disk drive (HDD) 304, a power supply control unit 305, a LAN controller (LANC) 306, and a LAN interface (I/F) 307.

The main control unit 300 controls the printer unit 400 to print an image based on a print job received from an external apparatus such as the PC 11, thereby implementing a print function. Furthermore, the main control unit 300 controls the scanner unit 100 and the printer unit 400 so that the scanner unit 100 scans a document image to obtain image data and the printer unit 400 prints an image based on the image data, thereby implementing a copy function.

The main CPU 301 controls the entire image forming apparatus 10. The main CPU 301 reads out programs stored in the ROM 302 or the HDD 304 and executes the programs, thereby implementing functions of the image forming apparatus 10, such as the print function and the copy function.

The RAM 303 is a volatile memory such as a double data rate synchronous dynamic random access memory (DDR SDRAM). The RAM 303 is used to store the programs to be executed by the main CPU 301 and temporary data to be used by the main CPU 301.

The HDD 304 is a storage device connected to the main CPU 301 based on, for example, serial advanced technology attachment (ATA). The HDD 304 is used to temporarily store various kinds of setting information about the image forming apparatus 10 and data to be used by the print function or the copy function.

The LANC 306 is connected to the main CPU 301 and the LAN I/F 307. The LANC 306 controls communication that is performed with an external apparatus such as the PC 11 or the server 12 through the LAN I/F 307.

The image forming apparatus 10 according to the present exemplary embodiment includes, as operation modes, a power saving mode and a standby mode. In the standby mode, power is supplied from a power supply (not illustrated) to the main CPU 301 and the main CPU 301 is ready to operate. In the power saving mode, no power is supplied from the power supply to the main CPU 301 and the main CPU 301 is not operable. The image forming apparatus 10 consumes less power in the power saving mode than in the standby mode. In the power saving mode, supply of power to the devices such as the printer unit 400 and the scanner unit 100 is also stopped.

The power supply control unit 305 performs power supply control of the entire image forming apparatus 10. In a case where no power is supplied to the main CPU 301 and the printer unit 400, the power supply control unit 305 performs on/off control of a power supply of the image forming apparatus 10 provided in the main control unit 300. In a case where power is supplied to the main CPU 301 and the printer unit 400, the main CPU 301 controls the power supply control unit 305 to perform on/off control of power supply to each of the units. The power supply control by the power supply control unit 305 may be implemented by a CPU of the power supply control unit 305 executing a program, or may be implemented by hardware logic such as a programmable logic device (PLD).

The power supply control unit 305 switches the power supply of the image forming apparatus 10 from an off state to an on state by using a WAKE_ON_UI signal 3006 from the operation unit 200, a WAKE signal 3007 from the LANC 306, or a WAKE signal 3008 from the human detection sensor 500, as a trigger. As a result, the power supply control unit 305 shifts the image forming apparatus 10 from the power saving mode to the standby mode.

The WAKE_ON_UI signal 3006 is output from the operation unit 200 in order to return the image forming apparatus 10 from the power saving mode to the standby mode in a case where the user inputs an operation to the operation unit 200 while the image forming apparatus 10 is in the power saving mode.

The WAKE signal 3007 is output from the LANC 306 in order to return the image forming apparatus 10 from the power saving mode to the standby mode in a case where an external apparatus such as the PC 11 or the server 12 accesses the image forming apparatus 10 through the LAN 13 or a print job is received therefrom through the LAN 13 while the image forming apparatus 10 is in the power saving mode.

The WAKE signal 3008 is output from the human detection sensor 500 in a case where the human detection sensor 500 detects the approach of the user intending to use the image forming apparatus 10 while the image forming apparatus 10 is in the power saving mode. In the present exemplary embodiment, in a case where the operation unit 200 is placed at the home position, the main CPU 301 performs control based on the WAKE signal 3008 from the human detection sensor 500. Execution of the control using the human detection sensor 500 is referred to as enabling a human detection sensor function. In contrast, in a case where the operation unit 200 is not placed at the home position, the main CPU 301 does not perform control based on the WAKE signal 3008 from the human detection sensor 500. Inexecution of the control using the human detection sensor 500 is referred to as disabling the human detection sensor function.

The HP sensor 260 detects whether the operation unit 200 is placed at the home position that is the predetermined initial installation position in the image forming apparatus 10. The HP sensor 260 may be any type of sensor such as a mechanical switch (e.g., tactile switch), a contactless switch (e.g., photo interrupter), a sensor using wireless communication such as near field communication (NFC) as long as the FTP sensor 260 can detect whether the operation unit 200 is placed at the home position.

In the present exemplary embodiment, while the operation unit 200 is placed at the home position, the HP sensor 260 is in the active state, and while the operation unit 200 is not placed at the home position, the HP sensor 260 is in the inactive state. The HP sensor 260 notifies the main CPU 301 that the operation unit 200 is not placed at the home position.

Figure 4:
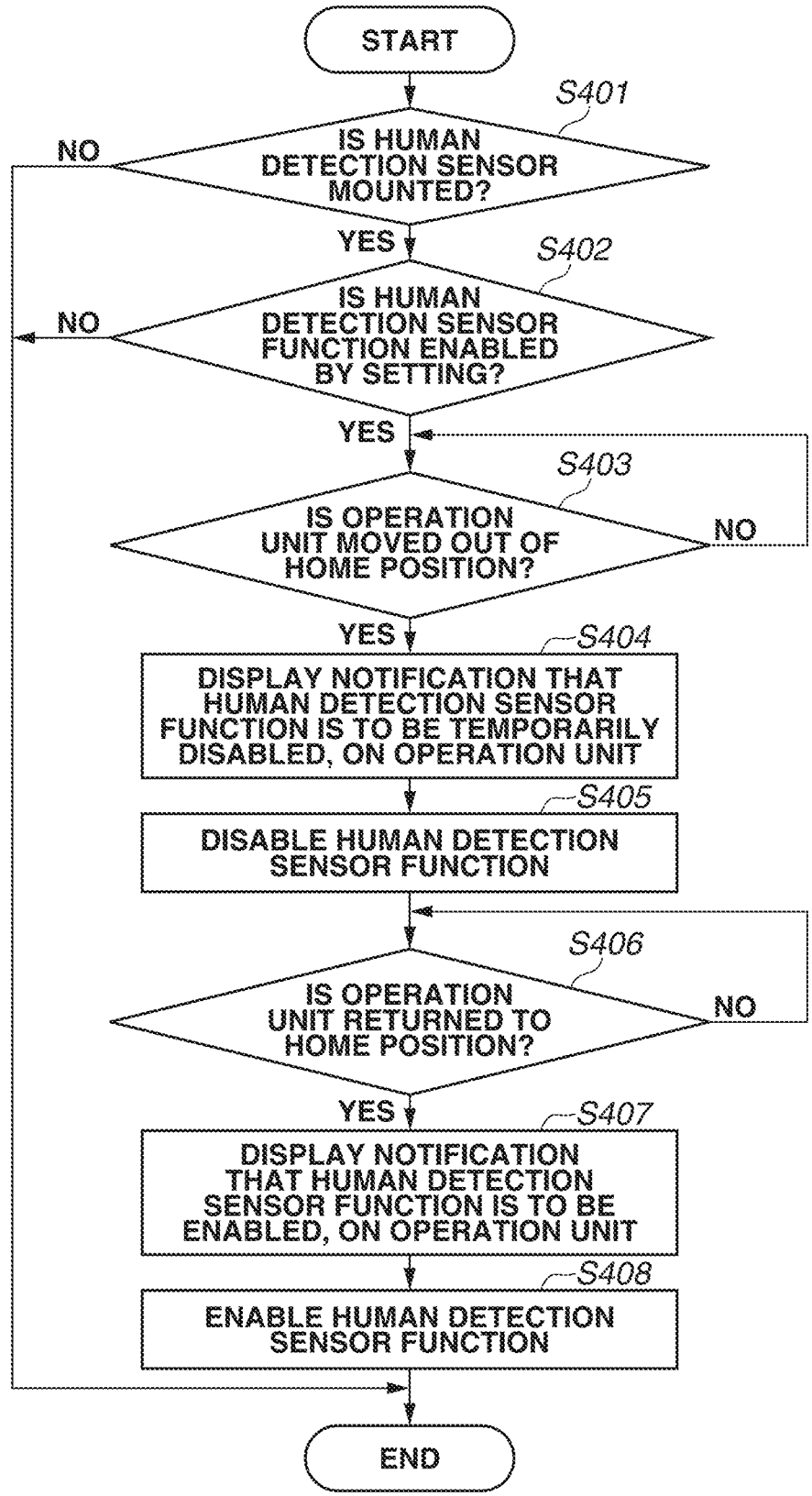
FIG. 4 is a flowchart illustrating an example of processing for enabling or disabling a function of the human detection sensor according to one embodiment.

FIG. 4 is a flowchart illustrating processing for enabling or disabling the human detection sensor function according to the present exemplary embodiment. The processing in the flowchart is performed by the main CPU 301 of the image forming apparatus 10.

First, in step S401, the main CPU 301 attempts to communicate with the human detection sensor 500, and determines whether the human detection sensor 500 is mounted on the image forming apparatus 10.

In a case where the main CPU 301 determines that the human detection sensor 500 is not mounted on the image forming apparatus 10 (NO in step S401), the processing in the flowchart ends. In contrast, in a case where the main CPU 301 determines that the human detection sensor 500 is mounted on the image forming apparatus 10 (YES in step S401), the processing proceeds to step S402.

In step S402, the main CPU 301 reads out, from the HDD 304, a set value indicating whether the human detection sensor function is enabled or disabled in the image forming apparatus 10.

In a case where the main CPU 301 determines that the set value read out from the HDD 304 indicates that the human detection sensor function is disabled (NO in step S402), the processing in the flowchart ends. In contrast, in a case where the main CPU 301 determines that the set value read out from the HDD 304 indicates that the human detection sensor function is enabled (YES in step S402), the processing proceeds to step S403.

In step S403, the main CPU 301 uses the HP sensor 260 to monitor whether the operation unit 200 has been moved out of the home position.

The main CPU 301 continues the monitoring in step S403 until the HP sensor 260 detects the movement of the operation unit 200 out of the home position. In a case where the main CPU 301 determines that the HP sensor 260 detects the movement of the operation unit 200 out of the home position (YES in step S403), the processing proceeds to step S404.

Figure 8A:
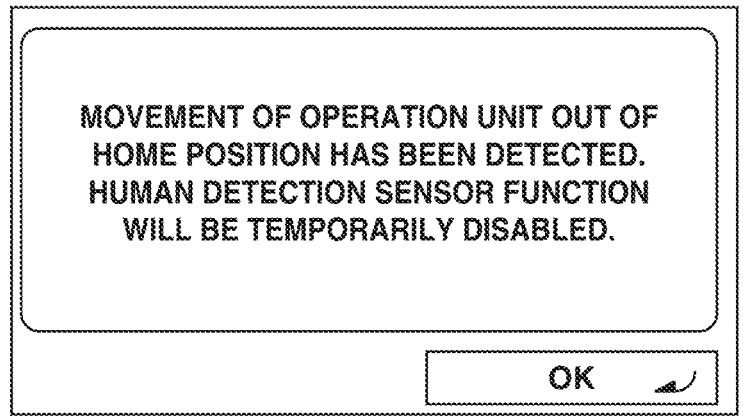
FIGS. 8A to 8D are diagrams each illustrating an example of a screen to be displayed in order to notify a user that the function of the human detection sensor is to be enabled or disabled according to one embodiment.

In step S404, the main CPU 301 displays, on the display portion (not illustrated) of the operation unit 200, a screen notifying the user that the human detection sensor function is to be temporarily disabled because the operation unit 200 has been moved out of the home position, as illustrated in FIG. 8A. The processing then proceeds to step S405.

In step S405, the main CPU 301 writes, in the HDD 304, a set value for disabling the human detection sensor function in order to temporarily disable the human detection sensor 500. Furthermore, the main CPU 301 instructs the human detection sensor 500 to disable detection, via the power supply control unit 305. The processing then proceeds to step S406. In step S405, the main CPU 301 may store, the current sensitivity of the human detection sensor 500, and write, in the HDD 304, a set value for setting the sensitivity of the human detection sensor 500 to low.

In step S406, the main CPU 301 uses the HP sensor 260 to monitor whether the operation unit 200 has been returned to the home position.

The main CPU 301 continues the monitoring in step S406 until the HP sensor 260 detects the return of the operation unit 200 to the home position. In a case where the main CPU 301 determines that the HP sensor 260 detects the return of the operation unit 200 to the home position (YES in step S406), the processing proceeds to step S407.

Figure 8B:
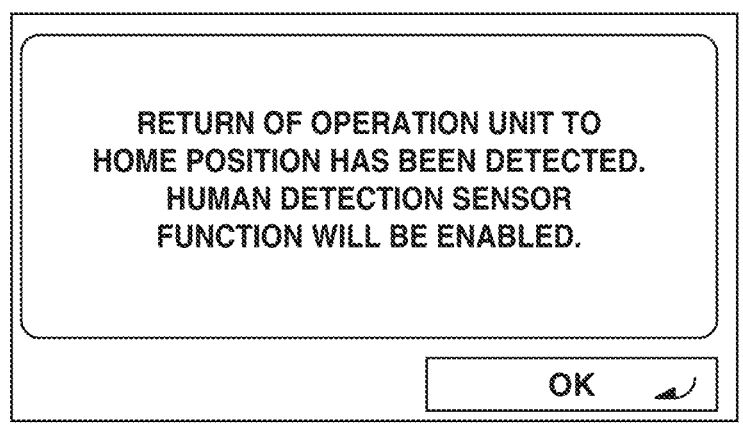

In step S407, the main CPU 301 displays, on the display portion (not illustrated) of the operation unit 200, a screen notifying the user that the human detection sensor function is to be enabled because the operation unit 200 has been returned to the home position, as illustrated in FIG. 8B. The processing then proceeds to step S408.

In step S408, the main CPU 301 writes, in the HDD 304, a set value for enabling the human detection sensor function in order to enable the human detection sensor 500. Furthermore, the main CPU 301 instructs the human detection sensor 500 to enable detection, via the power supply control unit 305. The processing in the flowchart then ends. In step S408, the main CPU 301 may write, in the HDD 304, a set value of the sensitivity of the human detection sensor 500 stored in step S405. The processing in the flowchart then ends.

As described above, in the present exemplary embodiment, in a case where the HP sensor 260 detects the movement of the operation unit 200 out of the home position, a notification that the human detection sensor function is to be temporarily disabled is displayed on the operation unit 200, and the human detection sensor function is temporarily disabled.

As a result, in a case where the operation unit 200 is moved by the user and the range in which the human detection sensor 500 can detect a person is changed, it is possible to prevent the human detection sensor 500 from wastefully continuing the detection operation in the range where a person is undetectable. Furthermore, it is possible to prevent the human detection sensor 500 from erroneously detecting a person just passing near the image forming apparatus 10 and not intending to use the image forming apparatus 10.

A second exemplary embodiment will be described next. The second exemplary embodiment is different from the first exemplary embodiment in that, in a case where the HP sensor 260 detects the movement of the operation unit 200 out of the home position, a screen for the user to select whether to temporarily disable the human detection sensor function is displayed on the operation unit 200. In the present exemplary embodiment, in a case where the user selects keeping the human detection sensor function enabled, the human detection sensor function is kept enabled, and a warning alerting the user that detection accuracy of the human detection sensor 500 may deteriorate is displayed.

The second exemplary embodiment will be described below with reference to drawings. Redundant description of a configuration in common with the configuration described in the first exemplary embodiment will be omitted as appropriate.

Figure 5:
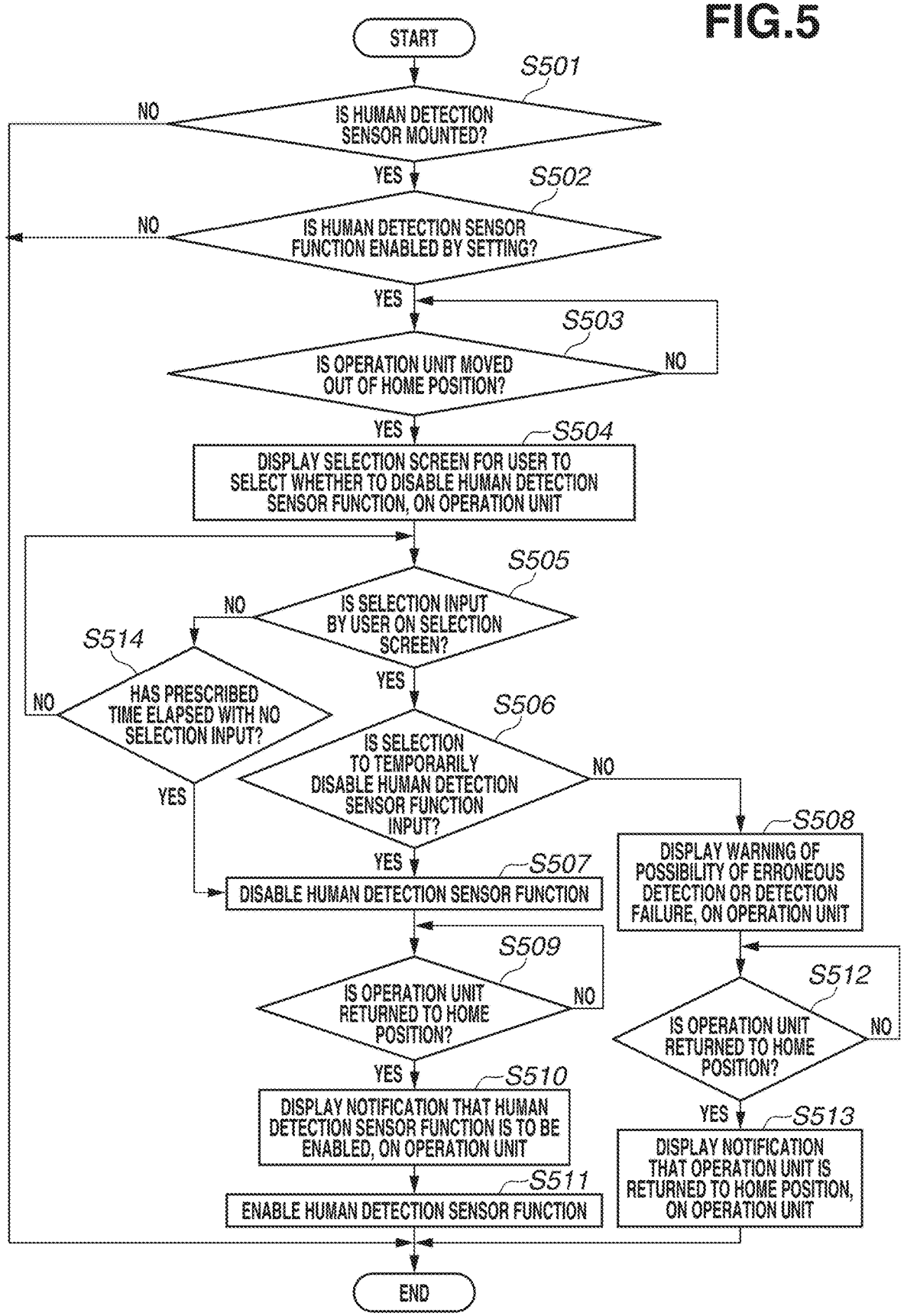
FIG. 5 is a flowchart illustrating another example of the processing for enabling or disabling the function of the human detection sensor according to one embodiment.

FIG. 5 is a flowchart illustrating processing for enabling or disabling the human detection sensor function according to the present exemplary embodiment. The processing in the flowchart is performed by the main CPU 301 of the image forming apparatus 10, similarly to the processing according to the first exemplary embodiment.

In step S501, the main CPU 301 attempts to communicate with the human detection sensor 500, and determines whether the human detection sensor 500 is mounted on the image forming apparatus 10.

In a case where the main CPU 301 determines that the human detection sensor 500 is not mounted on the image forming apparatus 10 (NO in step S501), the processing in the flowchart ends. In contrast, in a case where the main CPU 301 determines that the human detection sensor 500 is mounted on the image firming apparatus 10 (YES in step S501), the processing proceeds to step S502.

In step S502, the main CPU 301 reads out, from the HDD 304, a set value indicating whether the human detection sensor function is enabled or disabled in the image forming apparatus 10.

In a case where the main CPU 301 determines that the set value read out from the HDD 304 indicates that the human detection sensor function is disabled (NO in step S502), the processing in the flowchart ends. In contrast, in a case where the main CPU 301 determines that the set value read out from the HDD 304 indicates that the human detection sensor function is enabled (YES in step S502), the processing proceeds to step S503.

In step S503, the main CPU 301 uses the HP sensor 260 to monitor whether the operation unit 200 has been moved out of the home position.

The main CPU 301 continues the monitoring in step S503 until the HP sensor 260 detects the movement of the operation unit 200 out of the home position. In a case where the main CPU 301 determines that the HP sensor 260 detects the movement of the operation unit 200 out of the home position (YES in step S503), the processing proceeds to step S504.

Figure 8C:
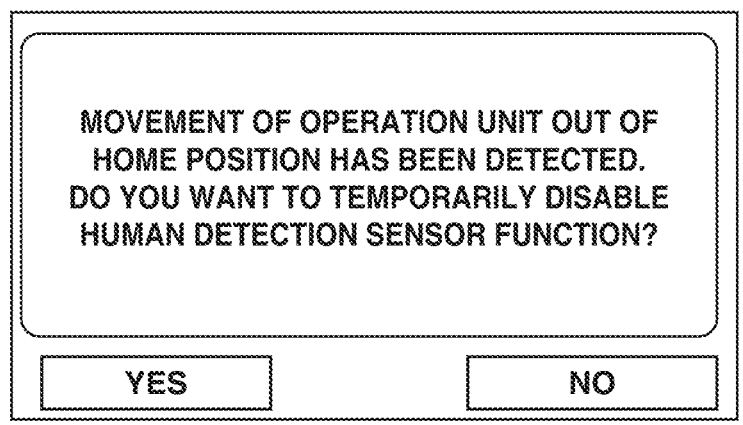

In step S504, the main CPU 301 displays, on the display portion (not illustrated) of the operation unit 200, a selection screen for the user to select whether the human detection sensor function is to be temporarily disabled or to be kept enabled after the operation unit 200 has been moved out of the home position, as illustrated in FIG. 8C.

In step S505, the main CPU 301 monitors whether a selection to temporarily disable the human detection sensor function or a selection to keep the human detection sensor function enabled has been input via the input portion (not illustrated) of the operation unit 200.

In a case where the main CPU 301 determines that a selection to temporarily disable the human detection sensor function or a selection to keep the human detection sensor function enabled has been input via the input portion (not illustrated) of the operation unit 200 (YES in step S505), the processing proceeds to step S506.

In contrast, in a case where the main CPU 301 determines that neither a selection to temporarily disable the human detection sensor function nor a selection to keep the human detection sensor function enabled has been input via the input portion (not illustrated) of the operation unit 200 (NO in step S505), the processing proceeds to step S514.

In a case where the main CPU 301 determines that a predetermined time has not elapsed in a state where neither a selection to temporarily disable the human detection sensor function nor a selection to keep the human detection sensor function enabled has been input via the input portion (not illustrated) of the operation unit 200 (NO in step S514), the processing returns to step S505.

In contrast, in a case where the main CPU 301 determines that the predetermined time has elapsed in the state where neither a selection to temporarily disable the human detection sensor function nor a selection to keep the human detection sensor function enabled has been input via the input portion (not illustrated) of the operation unit 200 (YES in step S514), the processing proceeds to step S507.

In a case where the main CPU 301 determines in step S506 that a selection to temporarily disable the human detection sensor function has been input (YES in step S506), the processing proceeds to step S507.

In contrast, in a case where the main CPU 301 determines in step S506 that a selection to keep the human detection sensor function enabled has been input (NO in step S506), the processing proceeds to step S508.

In step S507, the main CPU 301 displays, on the display portion (not illustrated) of the operation unit 200, a screen notifying the user that the human detection sensor function is to be temporarily disabled, as illustrated in FIG. 8A. Furthermore, in order to temporarily disable the human detection sensor 500, the main CPU 301 writes in the HDD 304 a set value for disabling the human detection sensor function, and instructs, via the power supply control unit 305, the human detection sensor 500 to disable detection. The processing then proceeds to step S509.

In step S509, the main CPU 301 uses the HP sensor 260 to monitor whether the operation unit 200 has been returned to the home position.

The main CPU 301 continues the monitoring in step S509 until the HP sensor 260 detects the return of the operation unit 200 to the home position. In a case where the main CPU 301 determines that the HP sensor 260 detects the return of the operation unit 200 to the home position (YES in step S509), the processing proceeds to step S510.

In step S510, the main CPU 301 displays, on the display portion (not illustrated) of the operation unit 200, a screen notifying the user that the human detection sensor function is to be enabled because the operation unit 200 has been returned to the home position, as illustrated in FIG. 8B. The processing then proceeds to step S511.

In step S511, the main CPU 301 writes in the HDD 304 a set value for enabling the human detection sensor function in order to enable the human detection sensor 500. Furthermore, the main CPU 301 instructs the human detection sensor 500 to enable detection, via the power supply control unit 305. The processing in the flowchart then ends.

Figure 8D:
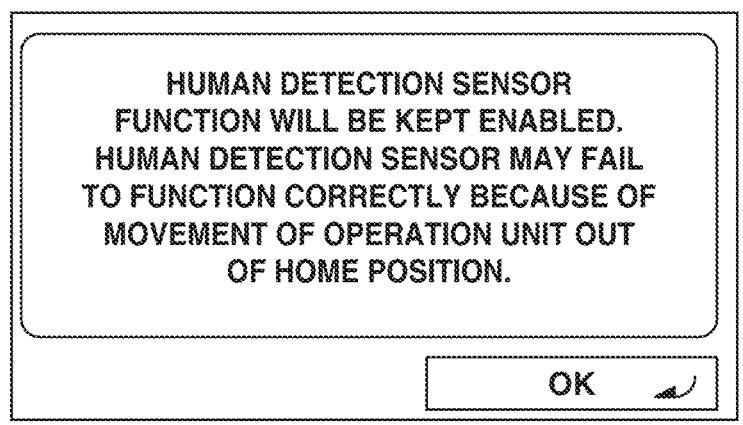

In step S508, the main CPU 301 displays, on the display portion (not illustrated) of the operation unit 200, a warning that the human detection sensor 500 may fail to correctly detect the approach of the user intending to operate the image forming apparatus 10, as illustrated in FIG. 8D. This is because, since the operation unit 200 has been moved out of the home position, the human detection sensor 500 may not be able to detect the user approaching the operation unit 200 or may erroneously detect, for example, the user next to the image forming apparatus 10. The processing then proceeds to step S512.

In step S512, the main CPU 301 uses the HP sensor 260 to monitor whether the operation unit 200 has been returned to the home position.

The main CPU 301 continues the monitoring in step S512 until the HP sensor 260 detects the return of the operation unit 200 to the home position. In a case where the main CPU 301 determines that the HP sensor 260 detects the return of the operation unit 200 to the home position (YES in step S512), the processing proceeds to step S513.

In step S513, the main CPU 301 displays, on the display portion (not illustrated) of the operation unit 200, a notification that the operation unit 200 has been returned to the home position. The processing in the flowchart then ends.

As described above, in the present exemplary embodiment, in a case where the HP sensor 260 detects the movement of the operation unit 200 out of the home position, the screen for the user to select whether to temporarily disable the human detection sensor function is displayed on the operation unit 200. Furthermore, in a case where the user selects keeping the human detection sensor function enabled, the human detection sensor function is kept enabled, and a warning alerting the user that the detection accuracy of the human detection sensor 500 may deteriorate is displayed.

As a result, in a case where the operation unit 200 is moved by the user and the range in which the human detection sensor 500 can detect a person is changed, it is possible to prevent the human detection sensor 500 from wastefully continuing the detection operation in the range where a person is undetectable. Furthermore, it is possible to notify the user who desires to keep the human detection sensor 500 enabled, in advance, that the detection accuracy of the human detection sensor 500 may deteriorate, and then to keep the human detection sensor function enabled.

In the first exemplary embodiment and the second exemplary embodiment, the case where the human detection sensor 500 is installed in the main body housing of the image forming apparatus 10 has been described. In a third exemplary embodiment, a case where the human detection sensor 500 is mounted on the operation unit 200 will be described as an example.

The third exemplary embodiment will be described with reference to drawings. Redundant description of a configuration in common with the configuration described in the first exemplary embodiment or the second exemplary embodiment will be omitted as appropriate.

Figure 6A:
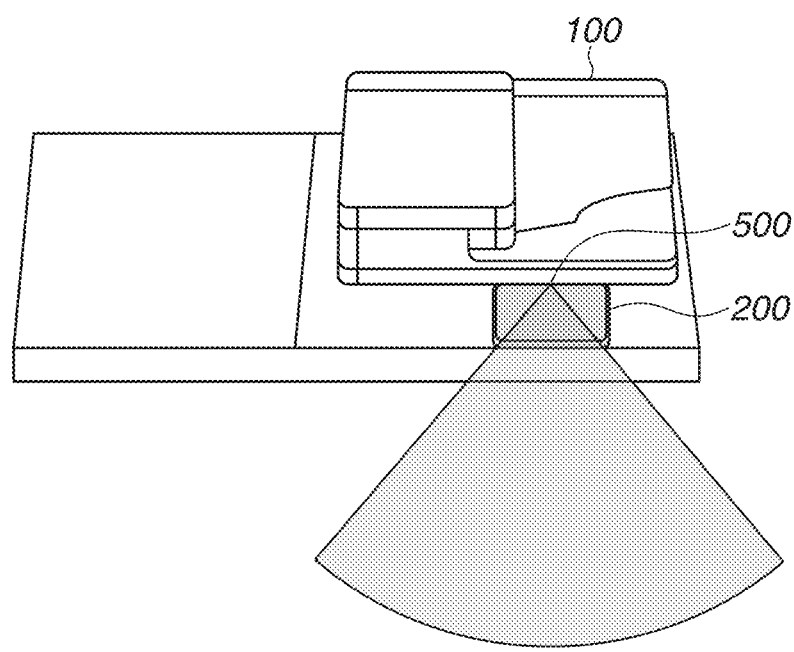
FIGS. 6A to 6C are schematic diagrams each illustrating another example of the layout of the scanner unit, the operation unit, and the human detection sensor in the image forming apparatus according to one embodiment.
Figure 6B:
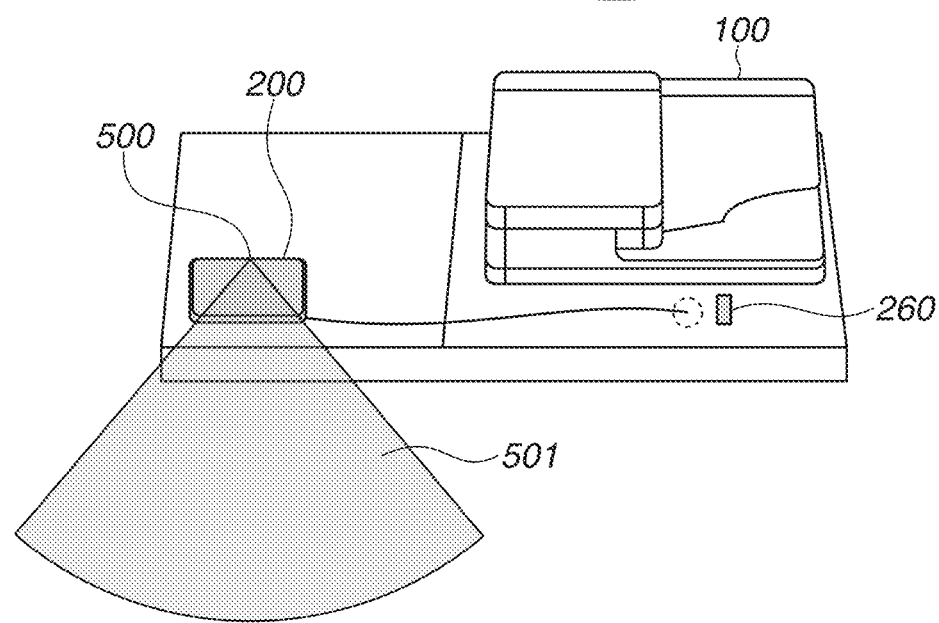
Figure 6C:
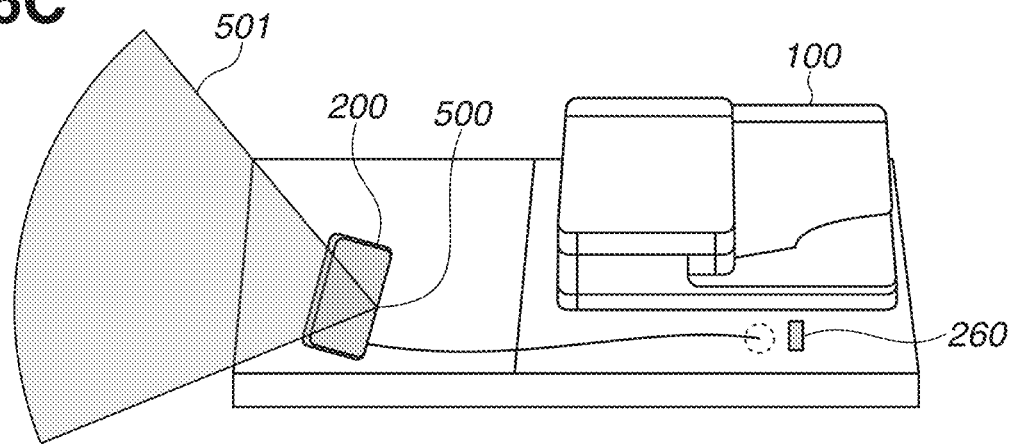

FIGS. 6A to 6C are schematic diagrams each illustrating an example of a layout of the scanner unit 100, the operation unit 200, and the human detection sensor 500 in the image forming apparatus 10 according to the present exemplary embodiment. In the present exemplary embodiment, a configuration in which the human detection sensor 500 is installed in and integrated with the operation unit 200 will be described as an example.

FIG. 6A schematically illustrates a layout in which the operation unit 200 is placed at the home position that is the predetermined initial installation position in the image forming apparatus 10.

FIG. 6B schematically illustrates a first layout in which the operation unit 200 is away from the home position. In the first layout of FIG. 6B, the operation unit 200 is placed in a state where the operation unit 200 is oriented in a direction in which the user in front of the image forming apparatus 10 can operate the operation unit 200 directly from the front side of the image forming apparatus 10 (i.e., a state where the detection range 501 of the human detection sensor 500 is oriented toward the front side of the image forming apparatus 10).

FIG. 6C schematically illustrates a second layout in which the operation unit 200 is away from the home position. In the second layout of FIG. 6C, the operation unit 200 is placed in a state where the operation unit 200 is oriented in a direction in which the user in front of the image forming apparatus 10 cannot operate the operation unit 200 directly from the front side of the image forming apparatus 10 (i.e., a state where the detection range 501 of the human detection sensor 500 is oriented in a direction deviated from the front side of the image forming apparatus 10).

In the present exemplary embodiment, the configuration in which the image forming apparatus 10 and the operation unit 200 are connected with the dedicated wired cable is described as an example, similarly to the first and second exemplary embodiments. Alternatively, the image forming apparatus 10 and the operation unit 200 may be connected by a wireless communication method such as a wireless LAN or Bluetooth®.

In the layout of FIG. 6A, the approach of the user is detectable in a case where the user approaches the operation unit 200 to operate the operation unit 200 and in a case where the user approaches the scanner unit 100 to operate the scanner unit 100.

In the first layout of FIG. 6B, the operation unit 200 is placed so that the detection range 501 of the human detection sensor 500 is oriented toward the front side of the image forming apparatus 10. Thus, in a case where the user approaches the operation unit 200 to operate the operation unit 200, the approach of the user is detectable. However, in a case where the user approaches the scanner unit 100 to operate the scanner unit 100, the approach of the user is undetectable.

In the second layout of FIG. 6C, the operation unit 200 is placed so that the detection range 501 of the human detection sensor 500 is oriented in a direction deviated from the front side of the image forming apparatus 10. Thus, the approach of the user is undetectable in a case where the user approaches the scanner unit 100 to operate the scanner unit 100 and in a case where the user approaches the operation unit 200 to operate the operation unit 200.

Furthermore, in the second layout of FIG. 6C, the operation unit 200 is placed so that the detection range 501 of the human detection sensor 500 is oriented in a lateral direction of the image forming apparatus 10. Thus, there is a possibility that a person just passing the side of the image forming apparatus 10 and not intending to use the image forming apparatus 10 may be erroneously detected.

Figure 7:
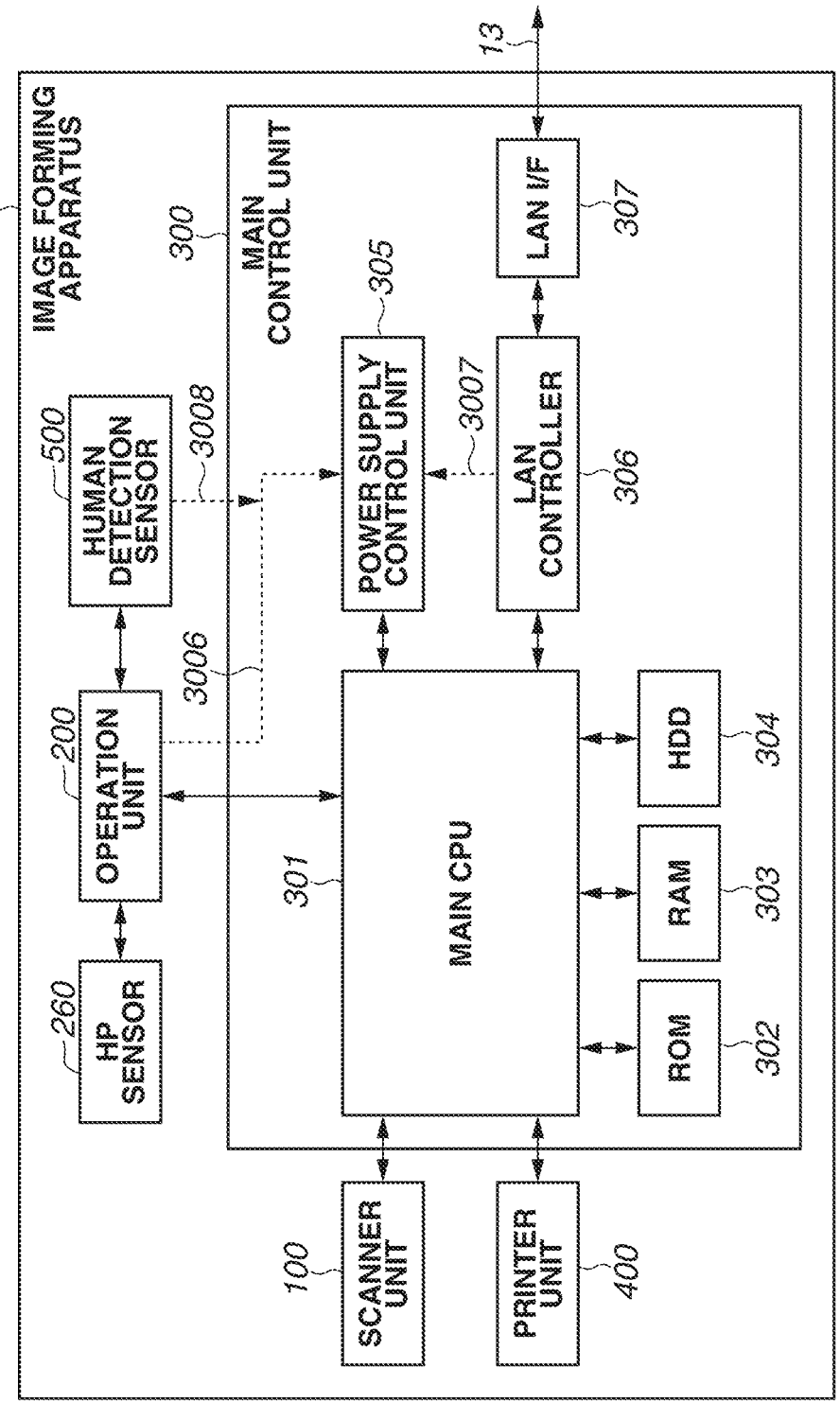
FIG. 7 is a block diagram illustrating another example of the hardware configuration of the image forming apparatus according to one embodiment.

FIG. 7 is a block diagram illustrating an example of a hardware configuration of the image forming apparatus 10 according to the present exemplary embodiment. In the present exemplary embodiment, differences from the configuration described in the first exemplary embodiment will be described, and redundant descriptions will be omitted.

The third exemplary embodiment will be described below with reference to drawings. Redundant description of a configuration in common with the configuration described in the first exemplary embodiment will be omitted as appropriate.

The present exemplary embodiment (illustrated in FIG. 7) is different from the first exemplary embodiment (illustrated in FIG. 3) in that the human detection sensor 500 and the HP sensor 260 are connected not to the main CPU 301 but to the operation unit 200.

Accordingly, notification of the signals from the human detection sensor 500 and the HP sensor 260 is transmitted to the main CPU 301 via the operation unit 200.

Furthermore, in the configuration illustrated in FIG. 7, the main CPU 301 is notified of the WAKE signal 3008 from the human detection sensor 500 as a logical sum (OR) with the WAKE_ON_UI signal 3006 from the operation unit 200. The other blocks are similar to those illustrated in FIG. 3. Thus, the description thereof will be omitted.

In the present exemplary embodiment, as the processing for disabling or enabling the human detection sensor function, which is performed by the main CPU 301, the processing in any of the flowchart according to the first exemplary embodiment (illustrated in FIG. 4) and the flowchart according to the second exemplary embodiment (illustrated in FIG. 5) is adoptable. Thus, the description of the flowchart will also be omitted.

As described above, in the present exemplary embodiment, the human detection sensor 500 is installed not in the main body housing of the image forming apparatus 10 but in the operation unit 200. Furthermore, in a case where the HP sensor 260 detects the movement of the operation unit 200 out of the home position, a notification that the human detection sensor function is to be temporarily disabled is displayed on the operation unit 200, and the human detection sensor function is temporarily disabled.

Accordingly, the image forming apparatus 10 in which the human detection sensor 500 is installed in the operation unit 200 also achieves effects similar to those of the image forming apparatus 10 according to each of the first and second exemplary embodiments.

Various embodiments of the present disclosure may also be implemented by supplying a program for implementing one or more functions according to the above-described exemplary embodiments to a system or an apparatus through a network or a storage medium, and causing one or more processors of a computer of the system or the apparatus to read out and execute the program. Furthermore, various embodiments of the present disclosure may be implemented by a circuit (e.g., application specific integrated circuit (ASIC)) for implementing one or more functions according to the above-described exemplary embodiments.

The exemplary embodiments of the present disclosure may be applied to a system including a plurality of devices or an apparatus including one device.

The present disclosure is not limited to the above-described exemplary embodiments. Various modifications can be made without departing from the spirit of the present disclosure, and such embodiments are not excluded from the scope of the present disclosure. In other words, configurations obtained by combining the above-described exemplary embodiments and modifications thereof are all included within the scope of the present disclosure.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), flash memory device, a memory card, and the like.

While various embodiments of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-169903, filed Oct. 7, 2020, which is hereby incorporated by reference herein in its entirety.

What is claimed is:

1. An information processing apparatus comprising:
an operation unit including an input portion configured to receive a user's operation, the operation unit being placed at a predetermined position on the information processing apparatus, the operation unit being removable from a housing of the information processing apparatus so as to be removable from the predetermined position by a user removing the operation unit from the predetermined position and placing the operation unit at another position on the information processing apparatus, wherein a location of the another position on the information processing apparatus is different from a location of the predetermined position on the information processing apparatus;
a first sensor configured to detect whether the operation unit is removed from the predetermined position;
a second sensor configured to detect a presence of a detection target in a detecting space beside the information processing apparatus;
one or more processors; and
at least one memory storing executable instructions, which when executed by the one or more processors, cause the information processing apparatus to:
disable a function of the second sensor in a case where the first sensor detects that the operation unit is removed from the predetermined position.

2. The information processing apparatus according to claim 1, wherein the instructions, when executed by the one or more processors, further cause the information processing apparatus to enable the disabled function of the second sensor in a case where the first sensor detects that the operation unit is returned to the predetermined position.

3. The information processing apparatus according to claim 1, wherein the operation unit further includes a display portion, and
wherein the display portion is configured to display a notification that the function of the second sensor is to be enabled or disabled.

4. The information processing apparatus according to claim 3, wherein the display portion is configured to display a first screen for a user to select whether to disable the function of the second sensor, in the case where the first sensor detects that the operation unit is removed from the predetermined position.

5. The information processing apparatus according to claim 4, wherein the instructions, when executed by the one or more processors, further cause the information processing apparatus to disable the function of the second sensor in response to the user selecting the disabling of the function of the second sensor on the first screen.

6. The information processing apparatus according to claim 4, wherein the display portion is configured to display a second screen indicating a possibility of the second sensor functioning incorrectly, in a case where the disabling of the function of the second sensor is not selected by the user on the first screen.

7. The information processing apparatus according to claim 1, wherein the second sensor is configured to detect a presence or an absence of a user approaching the operation unit.

8. The information processing apparatus according to claim 1, further comprising a scanner unit,
wherein the second sensor is configured to detect a presence or an absence of a user approaching the scanner unit.

9. The information processing apparatus according to claim 1, wherein the second sensor is mounted on the operation unit.

10. The information processing apparatus according to claim 9, wherein the second sensor is configured to detect a presence or an absence of a user approaching the operation unit, in a case where the operation unit is placed at the predetermined position.

11. The information processing apparatus according to claim 1, wherein communication between the operation unit and the one or more processors is performed via a wired cable connection between the information processing apparatus and the operation unit.

12. The information processing apparatus according to claim 1, wherein communication between the operation unit and the one or more processors is performed using a wireless communication method.

13. A method for controlling an information processing apparatus that includes an operation unit including an input portion configured to receive a user's operation, the operation unit being placed at a predetermined position on the information processing apparatus, the operation unit being removable from a housing of the information processing apparatus so as to be removable from the predetermined position by a user removing the operation unit from the predetermined position and placing the operation unit at another position on the information processing apparatus, wherein a location of the another position on the information processing apparatus is different from a location of the predetermined position on the information processing apparatus, the method comprising:

monitoring, using a first sensor, whether the operation unit is removed from the predetermined position;

detecting, using a second sensor, a presence of a detection target in a detecting space beside the information processing apparatus;

detecting, using the first sensor, that the operation unit is removed from the predetermined position; and disabling a function of the second sensor based on the first sensor detecting that the operation unit is removed from the predetermined position.

14. A non-transitory computer-readable storage medium storing one or more programs configured to be executed by one or more processors of the information processing apparatus, the one or more programs including instructions for causing the information processing apparatus to perform the method according to claim 13.

15. The information processing apparatus according to claim 1, wherein the second sensor is a human sensor, and wherein the detecting space is a space separated from the information processing apparatus in which an object can be detected by the human sensor.

16. The information processing apparatus according to claim 1, wherein the detection target is a human.

17. An information processing apparatus comprising:

an operation unit including an input portion configured to receive a user's operation, the operation unit being placed at a predetermined position on the information processing apparatus, the operation unit being removable from a housing of the information processing apparatus so as to be removable from the predetermined position by a user removing the operation unit from the predetermined position and placing the operation unit at another position on the information processing apparatus, wherein a location of the another position on the information processing apparatus is different from a location of the predetermined position on the information processing apparatus;

a first sensor configured to detect whether the operation unit is removed from the predetermined position;

a second sensor configured to detect a presence of a detection target in a detecting space beside the information processing apparatus;

one or more processors; and at least one memory storing executable instructions, which when executed by the one or more processors, cause the information processing apparatus to:

set a sensitivity of the second sensor; and set the sensitivity of the second sensor to a lowest sensitivity in a case where the first sensor detects that the operation unit is removed from the predetermined position.

\* \* \* \* \*